though each conduit serves only as a delivery conduit or a return conduit when the pump displacement control is on one side of neutral, the relative pressure between the two conduits may vary depending upon the degree of acceleration, the extent of application of the external load on the vehicle, or the abruptness of braking the vehicle by reducing the displacement of the pump. For example, the normally low pressure return conduit conveying fluid from the motor to the pump may be at a higher pressure than the normally high pressure delivery conduit during braking.

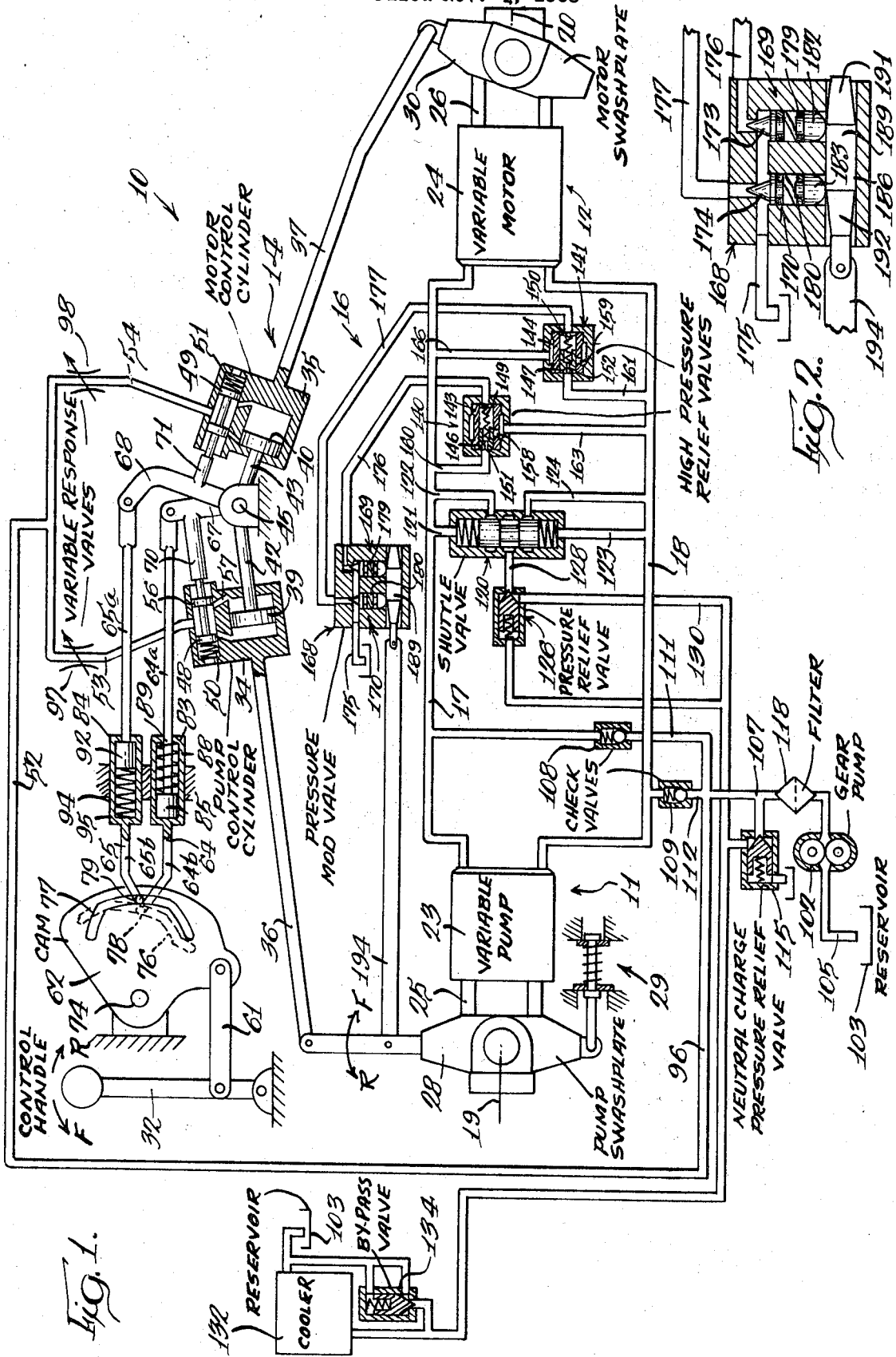

The sudden increase in pressure in the delivery conduit during acceleration or upon rapid load application, and the sudden increase in pressure in the return conduit during transmission braking are generally undesirable and produce abrupt jerking movement of the vehicle as well as possibly damage to the transmission and even the engine associated with the vehicle.

It is, therefore, desirable that means be provided for limiting the pressure in the main hydraulic lines during rapid acceleration, abrupt braking and sudden application of a load.

SUMMARY OF THE INVENTION

In accordance with the present invention pilot operated relief valves are provided for controlling the pressure in the main conduits interconnecting the pump and motor of a hydrostatic transmission. The pressure setting on each valve is modulated by a pilot operated valve responsive to pump displacement. When the pump displacement control is in a forward position a cam biases the pilot valve associated with the delivery conduit so that the pressure relief valve is at its maximum pressure setting. This permits the pressure in the delivery conduit to reach a relatively high value, e.g. 5,000 p.s.i., during acceleration of the vehicle. If, however, the operator moves the pump displacement control very rapidly, the pressure in the delivery conduit will exceed the high pressure setting of the relief valve and the excess pressure fluid will be bypassed to the return conduit across the relief valve. At this time an identical pressure relief valve associated with the return conduit is modulated in accordance with the position of the pump displacement control. This prevents the prime mover from overspeeding during deceleration. The amount of modulation can be matched to the specific braking characteristics of the engine. For example, the pressure relief setting on the relief valve associated with the return conduit may be modulated between 2,000 p.s.i. to 5,000 p.s.i. as the pump displacement control moves from a maximum displacement position toward neutral. Thus, if the operator brakes the vehicle by reducing the displacement of the pump during forward travel the pressure relief setting of the relief valve associated with the return conduit will increase. The modulation of the relief valve associated with the return conduit or passage provides the ability to maintain an acceptable torque level into the engine and yet increases the braking capability as the vehicle speed decreases. The specific modulation pressure range of the relief valve is matched to the dynamics of the braking capability of the vehicle and engine.

When the pump displacement control is reversed the functions of the main conduits are reversed and the formerly modulated relief valve in the forward state is placed at a high pressure setting, e.g. 5,000 p.s.i., and the formerly high pressure relief valve becomes the modulated valve since it is now associated with the return conduit. In this manner the identical matching of system pressure with the braking capabilities of the engine can be achieved in reverse.

DESCRIPTION OF THE DRAWINGS

FIG. 1 is a schematic illustration of a hydrostatic transmission according to the present invention; and FIG. 2 is an enlarged view of the pressure modulation valve shown in FIG. 1.

DESCRIPTION OF THE PREFERRED EMBODIMENT

Referring to the drawings in a hydrostatic transmission 10 is seen to include a reversible variable displacement pump 11, a variable displacement motor 12, a displacement control 14 for the pump and the motor, and a system pressure control 16. The pump 11 and motor 12 are interconnected by a closed hydraulic circuit including main conduits or passages 17 and 18. The pump 11 is adapted to be driven by a shaft indicated schematically at 19 connected with the prime mover of the associated vehicle (not shown). The variable displacement motor drives an output shaft 20 which is adapted to be connected through suitable gearing to the vehicle's propelling wheels or tracks.

Preferably both the pump and the motor are of an axial piston type having rotatable cylinder blocks 23 and 24, respectively, each with a plurality of cylinders in annular array and reciprocal pistons 25 and 26 (indicated schematically), respectively, having ends reciprocating in the cylinders. The pump 11 has a variable angle reversible swashplate 28 engaged by the projecting ends of pistons 25 for controlling the speed as well as direction of rotation of the output shaft 20. The swashplate 28 is urged to a neutral center position by a spring mechanism 29. The motor has a variable angle swashplate 30 movable only on one side of a minimum displacement position.

The displacement control 14 selects the displacement of the pump and the motor, and hence transmission ratio, in accordance with the manually adjusted position of a control handle 32. The swashplates 28 and 30 are positioned by control cylinders 34 and 35 through links 36 and 37, respectively. These cylinders are slidable on pistons 39 and 40 having rods 42 and 43 pivoted at 45. For supplying fluid to the cylinders 34 and 35 control valves 48 and 49 are provided slidable in suitable valve bores formed in the cylinders 34 and 35 respectively. Control fluid under pressure is delivered to the valves 48 and 49 through control passage 52 and branch passages 53 and 54. As the valves 48 and 49 shift from the position shown in FIG. 1 fluid will be ported from one of the control fluid lines to one or the other side of the associated pistons in the cylinders causing corresponding movement of the cylinders and the swashplates connected thereto. Both of the control cylinders 34 and 35 act as follow-up mechanisms relative to their servo valves 48 and 49. As the cylinders move in response to the porting of fluid across their associated control valves, they will travel to a position where one of the lands as at 56 will close a control passage as at 57 arresting movement of the control cylinder and the swashplate associated therewith. Since the control cylinders act as follow-up mechanisms, as system pressure changes cause variations in force on the swashplates, the control valves 48 and 49 will automatically adjust the pressure in their associated control cylinders to hold the swashplates in their preselected positions.

The control valves 48 and 49 are positioned by the control handle 32 through link 61, pivotally mounted cam 62, longitudinally slidable links 64 and 65, and pivotally mounted links 67 and 68 pivotal about pivot 45 and arranged to control the valves 48 and 49 by arms 70 and 71, which abut the ends of the valve stems. Springs 50 and 51 bias the valve stems 48 and 49 to follow abutments 70 and 71.

The cam 62 is pivotally mounted at 74 and has a pump control slot 76 and a motor control slot 77 receiving followers 78 and 79 on the ends of links 64 and 65, respectively. As the cam 62 is pivoted by movement of the control handle 32 the links 64 and 65 are moved longitudinally in accordance with the shape of the cam slots 76 and 77. These slots have a configuration such that as the control handle is moved from its neutral position shown towards maximum displacement in either direction the pump swashplate 28 will move towards maximum displacement with the motor swashplate remaining in its maximum displacement position, and with further movement of the control handle in the same direction the motor swashplate 30 will begin movement towards minimum displacement when the pump swashplate 28 reaches or nears its maximum displacement position.

Override assemblies 83 and 84 are provided in the links 64 and 65, respectively, to allow the operator to rapidly move the control handle 32 from full forward to full reverse and vice versa. In the event of a loss of control pressure the override springs will also serve to protect the links from damage. The override assembly 83 includes a piston 85 fixed to the end of link 64a, and link portion 64b has a cylinder 88 formed on the end thereof reeiving piston 85. A spring 89 within the cylinder 88 biases the piston 85 to the end of cylinder 88 opposite the link 64a, Spring 89 permits rapid movement of link 64b to the left, while abutment 70 and spring 50 permit rapid movement to the right.

The override assembly 84 includes a piston 92 fixed to the end of link portion 65a slidable in a cylinder 94 carried on the end of link portion 65b, and a spring 95 within the cylinder 94 biasing the piston 92 to the end of the cylinder adjacent the link 65a. Spring 95 permits rapid movement of link 65b to the right while abutment 71 and spring 51 permit rapid movement toward the left.

Thus, if the pump control link 64 is moved too rapidly to the left tending to move valve 48 to the left beyond a position which can be accommodated by the associated valve bore in cylinder 34 the link 64 will resiliently extend. At the same time, abutment 71 leaves stem 49, and spring 51 urges the stem leftward. Conversely, if the link 65 is moved too rapidly to the right tending to cause movement of the control valve 49 to the right beyond a position which can be accommodated by the associated valve bore in cylinder 35, the link 65 will yield. At the same time, abutment 70 may leave stem 48 to be moved by spring 50. While the cam slots 76 and 77 normally stage the displacements of the pump and the motor, it is possible when the handle is moved rapidly and the override assemblies 83 and 84 come into play, for the pump and motor control cylinders 34 and 35 to act simultaneously along with the swashplates 28 and 30.

Variable restrictions 97 and 98 are provided in branch lines 53 and 54 respectively, for selectively controlling the response rate of the servo cylinders 34 and 35.

A positive displacement gear-type replenishing and cooling pump 102 is provided and is driven by suitable means by the engine or prime mover in the associated transmission. This pump is in communication with a reservoir 103 through a conduit 105 for supplying replenishing and cooling fluid to the system through a replenishing and control fluid conduit 107. The capacity of the pump is sufficient to replace leakage fluid, to supply control fluid to the valves 48 and 49 through passage 96 and to supply cooling fluid to the circuit in excess of that required for the aforementioned purposes in order to maintain the transmission at a relatively cool temperature.

A pair of spring biased check valves 108 and 109 are in communication with conduit 107 through branch passages 111 and 112 in turn communicating with main conduits 17 and 18, respectively. The pump 102 thus supplies replenishing and cooling fluid to the low pressure side of the circuit i.e., the low pressure one of the conduits 17 and 18, when the pressure in one of the branch passages 111 and 112 exceeds that in the associated main conduit. When the pressure in one of the main conduits is at a high level the check valves 108, 109 associated therewith will be maintained closed. A spring biased makeup relief valve 115 communicates with the passage 107 and serves to relieve fluid under excessive pressure.

A suitable filter 118 is provided at the outlet of gear pump 102.

For the purpose of removing heated fluid from the low pressure side of the circuit a shuttle valve 120 is provided. The shuttle valve is in communication with the conduits 17 and 18 by means of the conduits 121, 122, 123 and 124 and provides a means for removing heated oil displaced by cool oil supplied by replenishing pump 102. The fluid pressure in the conduits 17 and 18 acts through the conduits 121 and 123, respectively, to appropriately position the shuttle valve so that communication is established between a low pressure relief valve 126 and the low pressure side of the circuit through either conduit 122 or conduit 124 and a central passage 128 connected to the relief valve. The heated fluid passing through the low pressure relief valve 126 goes to the reservoir 103 through line 130. Line 130 conveys this heated fluid to a cooler 132. A bypass valve 134 is provided so that the heated fluid may bypass the cooler 132 in the event of a malfunction therein. The shuttle valve 120 is spring centered to a closed position so that during the transition of reversing pressure in the main conduits none of the high pressure oil is lost from the circuit.

An important aspect of the present invention is the system pressure control circuit 16, referred to generally above, provided for limiting pressure in the main conduits 17 and 18 by dumping oil from the high pressure conduit to the low pressure conduit during rapid acceleration, abrupt braking and sudden application of the load.

Included in this pressure control are relief valves 140 and 141, identical in construction, for limiting the pressure in the main conduits 17 and 18, respectively. The valves include stationary valve sleeves 143, 144 in which movable valve members 146, 147 are slidable. The valve members 146, 147 are biased to their closed position shown by springs 149, 150 as well as fluid pressure acting on the rear side of the valve member. Orifices 151, 152 are provided in the movable valve members 146, 147. The valve members when in an open position communicate a portion of ports 158, 159 to the interior of the sleeves. The forward side of the valve member 146 communicates with the fluid in main conduit 17 through line 160 and the forward side of valve member 147 communicates with main conduit 18 through line 161. When sufficient pressure is achieved in conduit 17 valve member 146 will move to the right permitting fluid to pass from conduit 17 through passage 160 and out port 158 and passage 163 to main conduit 18 (which would then be the low pressure conduit). Likewise when the pressure limit of valve 141 is exceeded, fluid from main conduit 18 will flow through passage 161 opening valve member 147 passing through port 159 and passage 166 to the main conduit 17 (which would then be the low pressure conduit).

The valve members 146 and 147 are biased to their closed position by fluid pressure acting on the rear side of these valves which is provided by the bleed orifices 151 and 152 in the valve members 146 and 147, respectively. By modulating the fluid pressure on the rear side of these valve members the pressure relief setting thereof may be controlled. For this purpose a pressure modulating valve 168 is provided including pilot valves 169 and 170 for controlling the pressure behind valve members 146 and 147, respectively.

The valves 169 and 170 include movable valve members 173, 174 (FIG. 2) which when open provide communication between the rear side of the valve members 146 and 147 and a suitable drain passage 175 through passages 176 and 177, respectively. The valve members 173 and 174 are biased to the closed position shown in the drawings by springs 179 and 180 variably biased by plungers 182 and 183.

The plungers are positioned by an axially slidable spool cam 186 including a cylindrical central portion 189 which when in a neutral position places both of the plungers 182 and 183 in their uppermost positions effecting a maximum bias for the valve members 173 and 174. Extending from the central cylindrical portion 189 are tapered end portions 191 and 192.

The cam member 186 is positioned in response to the position of swashplate 28 by a link 194 which shifts the cam 186 to the right in response to a forward displacement of the swashplate 28 and shifts the cam to the left in response to a reverse displacement of swashplate 28. As the cam 186 shifts to the right from the neutral position shown in FIG. 1 plunger 182 will ride on cylindrical portion 189 maintaining valve 173 in its maximum pressure relief setting and the plunger 183 will ride down tapered cam portion 192 decreasing the biasing force on pilot valve member 174. Conversely when the cam 186 is shifted to the left from the neutral position shown plunger 183 will ride on cylindrical cam portion 189 maintaining a predetermined maximum biasing force on valve member 174 while the plunger 182 will ride down on cam portion 191 decreasing the biasing force on valve member 173 in accordance with the position of cam member 186.

In this manner the cracking pressure of the pilot valve members 173 and 174 is mechanically modulated by the position of swashplate 28 between a low value, e.g. 2,000 p.s.i., and a predetermined high value, e.g. 5,000 p.s.i. Thus, the biasing force on the relief valves 140 and 141 is modulated between these high and low pressure values thereby variably limiting the pressure in the main conduits 17 and 18. When the pressure in one of the main conduits exceeds that modulated on the opposite side of the valve members 146 and 147 by the pilot valves the valve members 146 and 147 will open permitting fluid to bypass to the low pressure conduit.

The operation of the system pressure control 16 is as follows. With the vehicle standing still, the operator begins acceleration by pivoting the control handle 32 in the forward direction (F) shifting link 64 to the right with control valve 48 thereby porting fluid to the right side of cylinder 34. This causes clockwise pivotal movement of the pump swashplate 28 putting the pump into stroke. The pump delivers high pressure fluid through main conduit 17 to the motor 12 causing rotation of the motor propelling the vehicle in a forward direction. As the cam swashplate 28 pivots clockwise, the valve plunger 182 rides on the cylindrical high portion 189 of the cam maintaining the pilot valve 169 at its maximum pressure setting which biases relief valve 140 to its maximum pressure relief setting. If the operator attempts to accelerate the vehicle too rapidly, or if a load is suddenly encountered the pressure in main conduit 17 may exceed the maximum pressure relief setting of valve 140, e.g. 5,000 p.s.i. In this event, valve member 173 yields, and valve member 146 will open porting fluid from conduit 17 to conduit 18 until the pressure in conduit 17 returns below the maximum pressure relief setting of valve 140.

When the cam 28 is on the forward side of neutral the relief valve 141 is modulated to provide variable low pressure relief for the main conduit 18, then the return conduit, in accordance with pump displacement. If during the forward travel of the vehicle the operator reduces the displacement of the pump 11 by moving the control 32 toward neutral, the motor 12 will act as a pump driven by the inertia of the associated vehicle tending to drive the pump 11 as a motor. The pump thus acts as a metering device for flow from the motor and inherently tends to have an increased braking effect on the motor as the displacement of the pump 11 is reduced. The pressure relief valve 141 smooths out the braking effect and prevents very abrupt braking which would otherwise be possible.

With the motor 12 acting as a pump with the cam 28 in a forward displacement position, the pressure in the main conduits reverses with conduit 18 becoming the high pressure conduit and conduit 17 becoming the low pressure conduit. If the cam 28 is initially in its maximum forward displacement position and then moved toward neutral the pressure setting of pilot valve 170 will be modulated by cam portion 192 from a minimum pressure setting, e.g. 2,000 p.s.i., towards its maximum pressure setting, e.g., 5,000 p.s.i. If the pressure in conduit 18 at this time exceeds the modulated low pressure setting of valve 141, valve member 147 will open permitting relief of fluid in conduit 18 through line 161 to main conduit 17 thereby reducing the braking effect. The shape of the cam 192, as well as 191, is determined so that the amount of modulation of the pilot valve is matched to the specific braking characteristics of the engine of the associated vehicle. In this manner the valve 141 when modulated maintains an acceptable torque level into the engine and yet provides an increased braking capability as the vehicle speed decreases.

As the operator moves the control handle 32 further towards neutral moving the displacement cam 28 nearer neutral, the pilot valve 170 will approach its high pressure setting as will the pressure relief valve 141 thereby permitting increased pressures in conduit 18. This thereby increases the braking effect.

The pressure control circuit 16 operates in an identical manner when the transmission and the vehicle are operating in reverse. In this case the functions of the valves 140 and 141 are reversed. Reverse drive is effected by movement of the operating handle 32 to the right causing the displacement servo-cylinder 34 to move the pump swashplate counterclockwise delivering fluid under pressure through conduit 18 to the motor with the motor returning fluid at low pressure through conduit 17 to the pump 11.

As the swashplate 28 moves from neutral the cam 186 is shifted to the left from its neutral position shown maintaining the pilot valve 170 in its maximum pressure setting and modulating pilot valve 169 to an increasingly lower pressure setting as the pump cam moves toward maximum reverse displacement. Thus, relief valve 141 is biased to a maximum pressure relief setting to limit pressure in conduit 18 during acceleration of the abrupt application of load, and pressure relief valve 140 is modulated at a lower pressure relief setting in accordance with pump displacement to control the braking effect in reverse by limiting pressure in conduit 17. This proceeds in the same manner as described above except that the function of the conduits 17 and 18 is reversed when the pump displacement is reversed.

While movement of the control in one direction has been designated "forward," and movement in the opposite direction designated "reverse," it should be understood that either direction may be forward, depending on the direction of rotation of the input shaft 19.

What is claimed is:

1. A hydrostatic transmission, comprising: a hydraulic pump unit, a hydraulic motor unit, means for varying the displacement of one of said units, first conduit means for delivering fluid from the pump unit to the motor unit, second conduit means for returning fluid from the motor unit to the pump unit, valve means for limiting pressure in said return conduit to control the braking effect of the transmission, and means for continuously varying the pressure limit setting of said valve means in response to said displacement varying means.

2. A hydrostatic transmission comprising: a hydraulic pump unit, a hydraulic motor unit, means for varying the displacement of one of said units, first conduit means for delivering fluid from the pump unit to the motor unit, second conduit means for returning fluid from the motor unit to the pump unit, valve means for limiting pressure in said return conduit to control the braking effect of the transmission, means for varying the pressure limit setting of said valve means in response to said displacement varying means, said displacement varying means including means to vary the displacement of the pump unit, said means for varying the pressure limit setting including means for increasing the pressure limit setting in response to a decrease in pump unit displacement, and means for decreasing the pressure limit setting in response to an increase in pump unit displacement, whereby the transmission braking effect may be increased by decreasing the displacement of the pump unit.

3. A hydrostatic transmission, comprising: a variable displacement hydraulic pump, means for varying the displacement of said pump in opposite directions from neutral, a hydraulic motor, first and second conduit means connecting the pump and the motor in closed circuit fashion, first valve means continuously communicating with said first conduit means for limiting pressure therein, second valve means continuously communicating with said second conduit means for limiting pressure therein, said valve means each having a high pressure setting and a lower pressure setting for selectively limiting the pressure in the associated conduit means to a high value or a lower value, means responsive to the direction of displacement of the pump for selectively effecting the high pressure setting of one valve means and the lower pressure setting of the other valve means, said first valve means including a movable valve member communicating with said first conduit means, resilient biasing means for urging the valve member closed against the force of fluid in said first conduit means, said second valve means including a second movable valve member communicating with said second conduit means, and resilient biasing means urging said second valve member closed in opposition to the force of fluid in said second conduit means, said means responsive to the direction of displacement of the pump unit including cam means positioned by said displacement varying means for positioning both of said biasing means.

4. A hydrostatic transmission as defined in claim 3, wherein said cam means is constructed so that when the displacement varying means is on one side of neutral one of the resilient biasing means will be positioned so that the associated valve is at the high pressure limit setting and the other resilient biasing means will be variably positioned to modulate the associated valve at lower pressure limit settings.

5. A hydrostatic transmission, comprising: a variable displacement hydraulic pump, means for varying the displacement of said pump in opposite directions from neutral, a hydraulic motor, first and second conduit means connecting the pump and the motor in closed circuit fashion, first valve means continuously communicating with said first conduit means for limiting pressure therein, second valve means continuously communicating with said second conduit means for limiting pressure therein, said valve means each having a high pressure setting and a lower pressure setting for selectively limiting the pressure in the associated conduit means to a high value or a lower value, means responsive to the direction of displacement of the pump for selectively effecting the high pressure setting of one valve means and the lower pressure setting of the other valve means, each of said valve means including a pilot operated relief valve, said relief valve including a movable valve member communicating at one side with the associated conduit means, said valve member when open permitting communication between the associated conduit means and the other conduit means, orifice means in said valve member permitting communication between the associated conduit means and the other side of said valve member tending to urge said valve member to a closed position, said valve means each including a pilot valve for controlling fluid pressure against said other side of said valve member, said pilot valves including a movable pilot valve member communicating with said other side of one of said valve members and movable to an open position to drain fluid from the other side of the one valve member thereby reducing the pressure limit of the associated relief valve, and spring means biasing each of said pilot valve members to a closed position, said means responsive to the direction of displacement of the pump including an axially shiftable spool cam engaging and positioning both of said spring means, said cam having a cylindrical central portion biasing both of said pilot valve members to said high pressure setting in neutral and having tapered end portions which selectively modulate the pilot valve members at lower pressure settings.

6. A hydrostatic transmission, comprising: a variable displacement hydraulic pump, means for varying the displacement of said pump in opposite directions from neutral, a hydraulic motor, first and second conduit means connecting the pump and the motor in closed circuit fashion, first valve means continuously communicating with said first conduit means for limiting pressure therein, second valve means continuously communicating with said second conduit means for limiting pressure therein, said valve means each having a high pressure setting and a lower pressure setting for selectively limiting the pressure in the associated conduit means to a high value or a lower value, means responsive to the direction of displacement of the pump for selectively effecting the high pressure setting of one valve means and the lower pressure setting of the other valve means, said means for selectively effecting the high pressure setting and the lower pressure setting including a first relief pilot valve connected to effect both the high and the low pressure setting of the first valve, and a second relief pilot valve connected to effect both the high and low pressure setting of the second valve means, both of said pilot valves being controlled by said displacement varying means.

7. A hydrostatic transmission as defined in claim 6, wherein said pilot valves are both controlled by a single cam, said cam being positioned by said displacement varying means and being constructed to place both of said pilot valves at a high pressure setting when the displacement varying means is in neutral.

References Cited

UNITED STATES PATENTS

| | | | |
|---|---|---|---|
| 3,217,493 | 11/1965 | Kempson et al. | 60—53 |
| 3,053,043 | 9/1962 | Knowler | 60—52VSPX |
| 3,106,108 | 10/1963 | Thoma et al. | 60—53AX |
| 3,383,857 | 5/1968 | Rauchel et al. | 60—53AX |
| 3,398,531 | 8/1968 | Swanson et al. | 60—53AX |

EDGAR W. GEOGHEGAN, Primary Examiner